United States Patent
Pikus et al.

(10) Patent No.: US 10,643,015 B2
(45) Date of Patent: May 5, 2020

(54) PROPERTIES IN ELECTRONIC DESIGN AUTOMATION

(75) Inventors: Fedor G. Pikus, Beaverton, OR (US);
Phillip A. Brooks, Tualatin, OR (US);
Gary S. Myron, Mulino, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 11/869,720

(22) Filed: Oct. 9, 2007

(65) Prior Publication Data
US 2008/0115097 A1 May 15, 2008

Related U.S. Application Data

(60) Provisional application No. 60/850,716, filed on Oct. 9, 2006.

(51) Int. Cl.
*G06F 17/50* (2006.01)
*G06F 30/398* (2020.01)
*G06F 119/18* (2020.01)

(52) U.S. Cl.
CPC ........ *G06F 30/398* (2020.01); *G06F 2119/18* (2020.01); *Y02P 90/265* (2015.11)

(58) Field of Classification Search
CPC ............. G06F 2217/12; G06F 17/5081; G06F 17/5036; G06F 17/5022; G06F 2217/06;
(Continued)

(56) References Cited

U.S. PATENT DOCUMENTS 5,822,218 A 10/1998 Moosa et al.
6,230,299 B1 5/2001 McSherry et al.
(Continued)

FOREIGN PATENT DOCUMENTS

WO 2004015595 A 2/2004

OTHER PUBLICATIONS

PCT International Search Report and Written Opinion dated Mar. 13, 2008 corresponding to PCT Application No. PCT/US2007/080860 filed Oct. 9, 2007.
(Continued)

*Primary Examiner* — Binh C Tat

(57) ABSTRACT

One or more properties can be associated with a design object in a microdevice design. The design object may be an object in a physical layout design for a microdevice, such as a geometric element in a layout design. The design object also may be a collection of geometric elements in a layout design, such as a net, a cell in a hierarchical design, or even a collection of all of the geometric elements in a layer of a design. Still further, the design object may even be an item in a logical circuit design, such as a net in a logical circuit design for an integrated circuit. The values of one or more properties may be statically assigned for or dynamically generated during a design process performed by an electronic design automation tool. A property may be assigned a constant value or a value defined by an equation or other type of script that includes one or more variables. A property may be simple, where the definition of the property's value is not dependent upon the value of any other properties. Alternately, a property may be a compound property, where the definition of the property's value incorporates another, previously-determined property value. Still further, a property may be an alternative property, where the property is assigned one value definition under a first set of conditions and assigned another value definition under a second set of conditions. A first electronic design automation process may generate one or more property values. The generated property values then can be passed to another electronic design automation process in the design analysis flow for its use.

19 Claims, 7 Drawing Sheets

(58) Field of Classification Search
CPC ............. G06F 2217/10; G06F 2217/84; G06F 17/5009; G06F 17/5068; G06F 17/5045; G06F 2217/82; G06F 1/44; G06F 7/70433; G06F 7/70616
USPC .......................................... 716/4–6, 100–107
See application file for complete search history.

(56) References Cited

U.S. PATENT DOCUMENTS

| | | | |
|---|---|---|---|
| 6,249,903 | B1 | 6/2001 | McSherry et al. |
| 6,339,836 | B1 | 1/2002 | Eisenhofer et al. |
| 6,397,372 | B1 | 5/2002 | Bozkus et al. |
| 6,415,421 | B2 | 7/2002 | Anderson et al. |
| 6,425,113 | B1 | 7/2002 | Anderson et al. |
| 6,457,157 | B1 * | 9/2002 | Singh et al. .................. 716/122 |
| 6,473,885 | B1 | 10/2002 | Wallace |
| 6,684,376 | B1 | 1/2004 | Kerzman et al. |
| 6,912,705 | B2 | 6/2005 | Korobkov |
| 6,983,440 | B1 | 1/2006 | Nequist |
| 7,017,141 | B2 * | 3/2006 | Anderson et al. .............. 716/19 |
| 7,093,229 | B2 * | 8/2006 | Pang et al. ....................... 716/21 |
| 7,107,571 | B2 * | 9/2006 | Chang ....................... G03F 1/26 716/52 |
| 7,155,689 | B2 * | 12/2006 | Pierrat et al. ...................... 716/4 |
| 7,281,222 | B1 | 10/2007 | Babcock |
| 7,506,277 | B1 * | 3/2009 | Arora .................. G06F 17/5081 716/122 |
| 7,509,601 | B2 | 3/2009 | Skoll et al. |
| 2001/0052107 | A1 | 12/2001 | Anderson et al. |
| 2002/0100005 | A1 * | 7/2002 | Anderson ........... G06F 17/5081 716/52 |
| 2004/0003365 | A1 | 1/2004 | Korobkov |
| 2004/0225986 | A1 | 11/2004 | Linl et al. |
| 2005/0071792 | A1 * | 3/2005 | Ferguson ............ G06F 21/6209 716/102 |
| 2005/0251771 | A1 | 11/2005 | Robles |
| 2006/0005154 | A1 | 1/2006 | Cobb et al. |
| 2006/0036977 | A1 | 2/2006 | Cohn et al. |
| 2006/0095884 | A1 | 5/2006 | Skoll et al. |
| 2006/0107240 | A1 | 5/2006 | Pikus et al. |
| 2006/0117280 | A1 | 6/2006 | Wallace |
| 2006/0218512 | A1 | 9/2006 | Arslan et al. |
| 2007/0055892 | A1 * | 3/2007 | Pikus .................. G06F 17/5081 713/189 |
| 2007/0277130 | A1 | 11/2007 | Lavelle |
| 2007/0288219 | A1 | 12/2007 | Zafar et al. |
| 2008/0115097 | A1 | 5/2008 | Pikus et al. |
| 2008/0115098 | A1 | 5/2008 | Chang et al. |
| 2008/0141193 | A1 | 6/2008 | Pikus |
| 2009/0031261 | A1 | 1/2009 | Smith et al. |
| 2009/0077513 | A1 | 3/2009 | Arsintescu |

OTHER PUBLICATIONS

Nick Bailey Cobb, "Fast Optical Process and Proximity Correction Algorithms for Integrated Circuit Manufacturing" (PhD Thesis), University of California, Berklely, 1998, pp. 1-139.

* cited by examiner

| | | | 509 |
|---|---|---|---|
| 503 | 505 | 507 | |
| DESIGN OBJECT 1 | 12, 24 | LIBRARY 1, 12 | .00009 |
| DESIGN OBJECT 2 | 16, 274 | LIBRARY 2, 37 | .00003 |
| DESIGN OBJECT 3 | 128, 320 | LIBRARY 3, 5 | .000042 |
| DESIGN OBJECT 4 | 100, 200 | LIBRARY 4, 14 | .000032 |
| DESIGN OBJECT 5 | 4, 63 | LIBRARY 5, 4 | .00004 |
| DESIGN OBJECT 6 | 57, 90 | LIBRARY 6, 1 | .000011 |
| DESIGN OBJECT 7 | 26, 240 | LIBRARY 7, 22 | .000012 |
| DESIGN OBJECT 8 | 40, 8 | LIBRARY 8, 9 | .000009 |
| DESIGN OBJECT 9 | 97, 23 | LIBRARY 9, 5 | .000061 |
| DESIGN OBJECT 11 | 121, 180 | LIBRARY 10, 11 | .000010 |

PROPERTIES IN ELECTRONIC DESIGN AUTOMATION

RELATED APPLICATIONS

This application claims priority to U.S. Provisional Patent Application No. 60/850,716 entitled "Properties In Electronic Design Automation," filed on Oct. 9, 2006, and naming Fedor Pikus as inventor, which application is incorporated entirely herein by reference.

FIELD OF THE INVENTION

The present invention is directed to the use of properties in electronic design automation. Various implementations of the invention may be useful for exchanging one or more properties between processes in an automated electronic design tool.

BACKGROUND OF THE INVENTION

Many microdevices, such as integrated circuits, have become so complex that these devices cannot be manually designed. For example, even a simple microprocessor may have millions and millions of transistors that cooperate to form the components of the microprocessor. As a result, electronic design automation tools have been created to assist circuit designers in analyzing a circuit design before it is manufactured. These electronic design automation tools typically will execute one or more electronic design automation (EDA) processes to verify that the circuit design complies with specified requirements, identify problems in the design, modify the circuit design to improve its manufacturability, or some combination thereof. For example, some electronic design automation tools may provide one or more processes for simulating the operation of a circuit manufactured from a circuit design to verify that the design will provides the desired functionality. Still other electronic design automation tools may alternately or additionally provide one or more processes for confirming that a circuit design matches the intended circuit schematic, for identifying portions of a circuit design that do not comply with preferred design conventions, for identifying flaws or other weaknesses the design, or for modifying the circuit design to address any of these issues. Examples of electronic design automation tools include the Calibre family of software tools available from Mentor Graphics Corporation of Wilsonville, Oreg.

As electronic design automation tools continue to develop, greater sophistication is being demanded from these tools. For example, in addition to detecting obvious design flaws, many electronic design automation tools are now expected to identify those design objects in a design that have a significant likelihood of being improperly formed during the manufacturing process, determine the resultant impact on manufacturing yield that these design objects will create, and/or identify design changes that will allow the design objects to be more reliably manufactured during the manufacturing process (e.g., "design-for-manufacture" (DFM)). In order to meet these expectations, a process executed by an electronic design automation tool may need to perform more calculations than with previous generations of electronic design automation tools. For example, a design rule check process may confirm that the polygons used in a physical layout design to form individual wiring lines are separated by a minimum specified distance. In addition, however, the design rule check process also may determine the likelihood that the polygons may nonetheless form the wiring lines with an erroneous bridging fault. This determination may require, for example, calculating the distance between the polygons, the length for which the polygons run adjacent to each other, and the thickness of the polygons at their adjacent portions.

Because even a single process executed by an electronic design automation tool may require millions of calculations, improvements in the speed and efficiency of electronic design automation tools are continuously being sought. Still further, additional functionality for electronic design automation tools also is continuously being sought, in order to improve their usefulness to circuit designers and manufacturers.

BRIEF SUMMARY OF THE INVENTION

Aspects of the invention relate to techniques of more efficiently processing data for electronic design automation. As will be discussed in detail below, embodiments of both tools and methods implementing these techniques have particular application for analyzing microdevice design data, such as integrated circuit design data.

According to various implementations of the invention, one or more properties can be associated with a design object in a microdevice design. The design object may be any data in a physical layout design for a microdevice. For example, the design object may be a geometric element in a layout design, such as a polygon, a polygon edge, a group of edges, or one or more vertices of a polygon. The design object also may be a collection of geometric elements in a layout design, such as a group of polygons, a cell in a hierarchical design, every cell of a specified type in a hierarchical design, or even a collection of all of the geometric elements in a layer of a design. Still further, the design object may be any item of data in another type of circuit design, including a non-geometric item, such as a net, device, or instance of a connection pin in a logical circuit design for an integrated circuit, or the placement of a cell in a hierarchical circuit design.

With some examples of the invention, one or more properties may be statically assigned during the execution of a design process by an electronic design automation tool. Alternately or additionally, one or more properties may be dynamically generated during the execution of a design process by an electronic design automation tool. A property may have any desired data value. For example, a property may be assigned a constant value or a vector value. Alternately, a property may be assigned a variable value. For example, a property may be defined by an equation or other type of script that includes one or more variables. A property's value thus may be dynamically derived from, e.g., geometric data in the design.

A property may be a simple property, where the definition of the property's value is not dependent upon the value of any other properties. Alternately, a property may be a compound property, where the definition of the property's value incorporates one or more other, previously-determined property values. Still further, a property may be an alternative property. With an alternative property, the property will have one value definition under a first set of conditions, and another value definition under a second set of conditions.

A property also may have multiple values. A property may have, for example, an x-coordinate value, a y-coordinate value, and a Z-coordinate value. Moreover, a property may have multiple, heterogeneous values. For example, a property may have both a numerical value and a string value. A property associated with a cell in a hierarchical layout circuit design thus could have a numerical value that may be, e.g., a device count of devices in the cell, and a string value that may be, e.g., a model name identifying the library source for the cell. Of course, a property with multiple heterogeneous values can have any combination of types of value definitions, including any combination of the types of value definitions described above (e.g., one or more constant value definitions, one or more vector value definitions, one or more dynamic value definitions, one or more simple value definitions, one or more compound value definitions, one or more string value definitions, etc.). A property may even have multiple alternative value definitions, where one or more of the alternative value definitions are of different types.

Advantageously, various implementations of the invention may allow a first electronic design automation process to generate one or more property values. The generated property values can then be passed to another electronic design automation process. For example, a design rule check (DRC) process may generate one or more property values for each of a plurality of geometric elements in a physical layout design. The design rule check process can then pass these property values onto a second electronic design automation process, such as an optical proximity correction (OPC) process. By using the property values provided by the design rule check process, the optical proximity correction process can avoid having to recalculate the property values. This use of property values may be particularly beneficial where the second electronic design automation process cannot easily calculate the property values itself, or where the second electronic design automation process cannot calculate the property values as quickly or efficiently as the first electronic design automation process.

Similarly, property values may be generated by a first portion of an electronic design automation process, and subsequently provided to a second portion of the same electronic design process. For example, one portion of a design-for-manufacture (DFM) process may generate a set of property values for each of a plurality of geometric elements in a physical layout design during a first operation. The first portion of the design-for-manufacture process can then provide the calculated properties to a second, subsequent portion of the process. This use of property values may be particularly beneficial where the second portion of the electronic design automation process cannot easily calculate the property values itself, or where the second portion of the electronic design automation process cannot calculate the property values as quickly or efficiently as the first portion of the electronic design automation process.

These and other features and aspects of the invention will be apparent upon consideration of the following detailed description.

BRIEF DESCRIPTION OF THE DRAWINGS

FIG. 5 illustrates one example of a type of array that may be employed by various embodiments of the invention.

DETAILED DESCRIPTION OF THE INVENTION

Exemplary Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
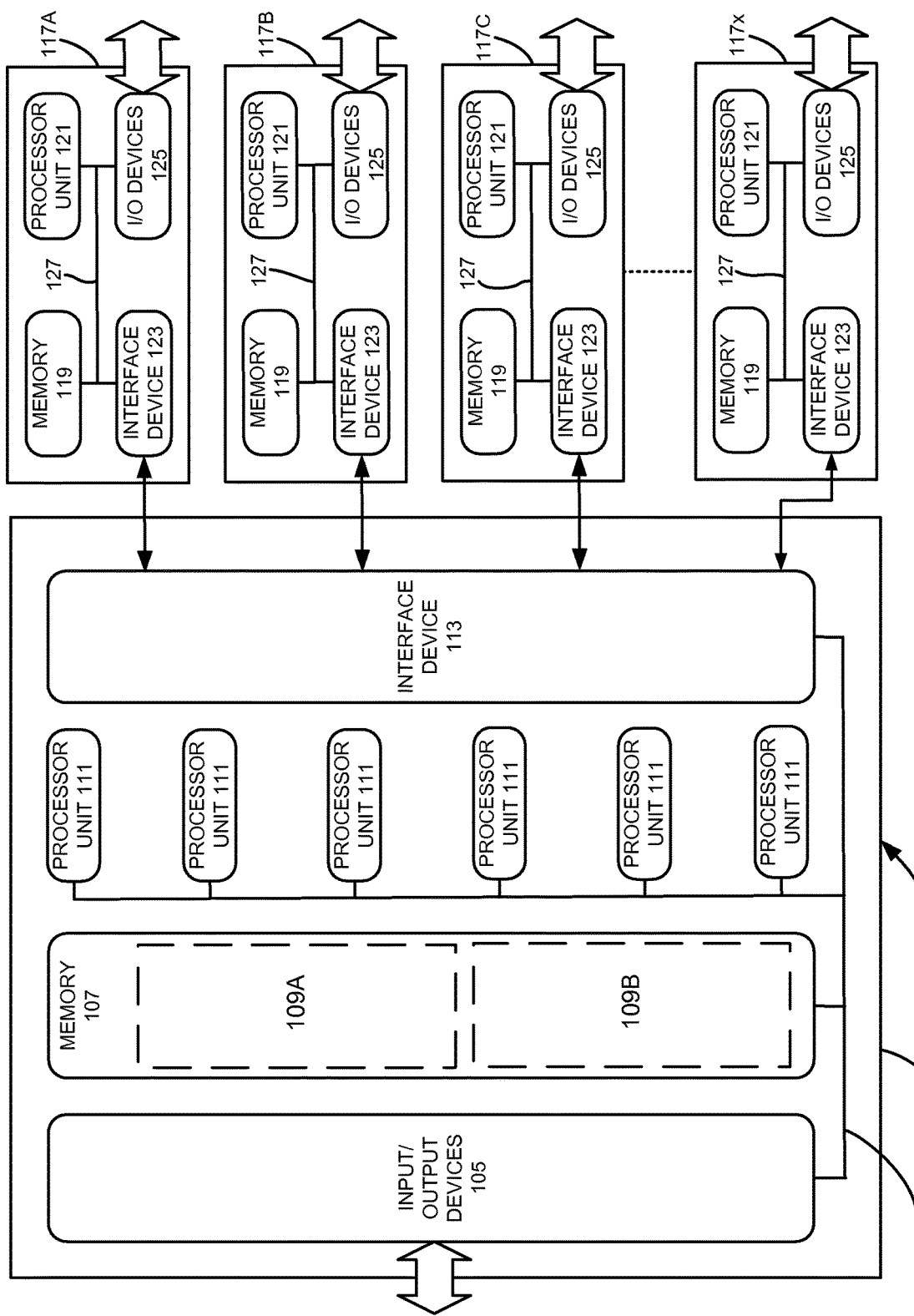
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations.

The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium®) or Xeon™ microprocessors, Advanced Micro Devices Athlon™ microprocessors or Motorola 68K/ Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
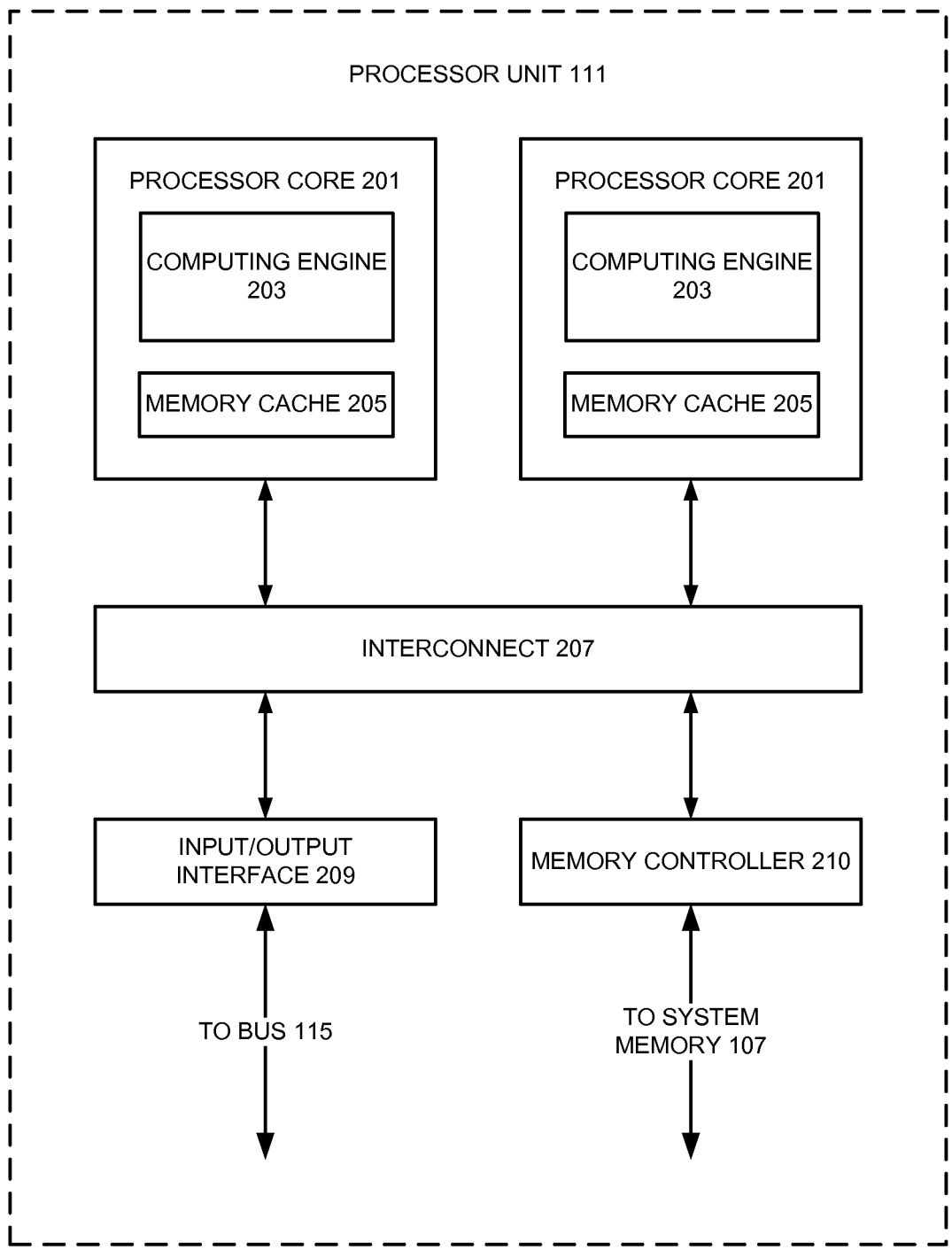
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/ Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor.

The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Electronic Design Automation

As previously noted, various embodiments of the invention are related to electronic design automation. In particular, various implementations of the invention may be used to improve the operation of electronic design automation software tools that identify, verify and/or modify design data for manufacturing a microdevice, such as a microcircuit. As used herein, the terms "design" and "design data" are intended to encompass data describing an entire microdevice, such as an integrated circuit device or micro-electromechanical system (MEMS) device. This term also is intended to encompass a smaller set of data describing one or more components of an entire microdevice, however, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. It should be noted that, unless otherwise specified, the term "design" as used herein is intended to encompass any type of design, including both a physical layout design and a logical design.

Designing and fabricating microcircuit devices involve many steps during a 'design flow' process. These steps are highly dependent on the type of microcircuit, its complexity, the design team, and the fabricator or foundry that will manufacture the microcircuit from the design. Several steps are common to most design flows, however. First, a design specification is modeled logically, typically in a hardware design language (HDL). Once a logical design has been created, various logical analysis processes are performed on the design to verify its correctness. More particularly, software and hardware "tools" verify that the logical design will provide the desired functionality at various stages of the design flow by running software simulators and/or hardware emulators, and errors are corrected. For example, a designer may employ one or more functional logic verification processes to verify that, given a specified input, the devices in a logical design will perform in the desired manner and provide the appropriate output.

In addition to verifying that the devices in a logic design will provide the desired functionality, some designers may employ a design logic verification process to verify that the logical design meets specified design requirements. For example, a designer may create rules such as, e.g., every transistor gate in the design must have an electrical path to ground that passes through no more than three other devices, or every transistor that connects to a specified power supply also must be connected to a corresponding ground node, and not to any other ground node. A design logic verification process then will determine if a logical design complies with specified rules, and identify occurrences where it does not.

After the logical design is deemed satisfactory, it is converted into physical design data by synthesis software. This physical design data or "layout" design data may represent, for example, the geometric elements that will be written onto a mask used to fabricate the desired microcircuit device in a photolithographic process at a foundry. For conventional mask or reticle writing tools, the geometric elements typically will be polygons of various shapes. Thus, the layout design data usually includes polygon data describing the features of polygons in the design. It is very important that the physical design information accurately embody the design specification and logical design for proper operation of the device. Accordingly, after it has been created during a synthesis process, the physical design data is compared with the original logical design schematic in a process sometimes referred to as a "layout-versus-schematic" (LVS) process.

Once the correctness of the logical design has been verified, and geometric data corresponding to the logical design has been created in a layout design, the geometric data then may be analyzed. For example, because the physical design data is employed to create masks used at a foundry, the data must conform to the foundry's requirements. Each foundry specifies its own physical design parameters for compliance with their processes, equipment, and techniques. Accordingly, the design flow may include a process to confirm that the design data complies with the specified parameters. During this process, the physical layout of the circuit design is compared with design rules in a process commonly referred to as a "design rule check" (DRC) process. In addition to rules specified by the foundry, the design rule check process may also check the physical layout of the circuit design against other design rules, such as those obtained from test chips, general knowledge in the industry, previous manufacturing experience, etc.

With modern electronic design automation design flows, a designer may additionally employ one or more "design-for-manufacture" (DFM) software tools. As previously noted, design rule check processes attempt to identify, e.g., elements representing structures that will almost certainly be improperly formed during a manufacturing process. "Design-For-Manufacture" tools, however, provide processes that attempt to identify elements in a design representing structures with a significant likelihood of being improperly formed during the manufacturing process. A "design-for-manufacture" process may additionally determine what impact the improper formation of the identified elements will have on the yield of devices manufactured from the circuit design, and/or modifications that will reduce the likelihood that the identified elements will be improperly formed during the manufacturing process. For example, a "design-for-manufacture" (DFM) software tool may identify wires that are connected by only a single via, determine the yield impact for manufacturing a circuit from the design based upon the probability that each individual single via will be improperly formed during the manufacturing process, and then identify areas where redundant vias can be formed to supplement the single vias.

It should be noted that, in addition to "design-for-manufacture," various alternate terms are used in the electronic design automation industry. Accordingly, as used herein, the term "design-for-manufacture" or "design-for-manufacturing" is intended to encompass any electronic design automation process that identifies elements in a design representing structures that may be improperly formed during the manufacturing process. Thus, "design-for-manufacture" (DFM) software tools will include, for example, "lithographic friendly design" (LFD) tools that assist designers to make trade-off decisions on how to create a circuit design that is more robust and less sensitive to lithographic process windows. They will also include "design-for-yield" (DFY) electronic design automation tools, "yield assistance" electronic design automation tools, and "chip cleaning" and "design cleaning" electronic design automation tools.

After a designer has used one or more geometry analysis processes to verify that the physical layout of the circuit design is satisfactory, the designer may then perform one or more simulation processes to simulate the operation of a manufacturing process, in order to determine how the design will actually be realized by that particular manufacturing process. A simulation analysis process may additionally modify the design to address any problems identified by the simulation. For example, some design flows may employ one or more processes to simulate the image formed by the physical layout of the circuit design during a photolithographic process, and then modify the layout design to improve the resolution of the image that it will produce during a photolithography process.

These resolution enhancement techniques (RET) may include, for example, modifying the physical layout using optical proximity correction (OPC) or by the addition of sub-resolution assist features (SRAF). Other simulation analysis processes may include, for example, phase shift mask (PSM) simulation analysis processes, etch simulation analysis processes and planarization simulation analysis processes. Etch simulation analysis processes simulate the removal of materials during a chemical etching process, while planarization simulation processes simulate the polishing of the circuit's surface during a chemical-mechanical etching process. These simulation analysis processes may identify, for example, regions where an etch or polishing process will not leave a sufficiently planar surface. These simulation analysis processes may then modify the physical layout design to, e.g., include more geometric elements in those regions to increase their density.

Once a physical layout design has been finalized, the geometric elements in the design are formatted for use by a mask or reticle writing tool. Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, the larger geometric elements in a physical layout design data will typically be "fractured" into the smaller, more basic polygons that can be written by the mask or reticle writing tool.

It should be appreciated that various design flows may repeat one or more processes in any desired order. Thus, with some design flows, geometric analysis processes can be interleaved with simulation analysis processes and/or logical analysis processes. For example, once the physical layout of the circuit design has been modified using resolution enhancement techniques, then a design rule check process or design-for-manufacturing process may be performed on the modified layout, Further, these processes may be alternately repeated until a desired degree of resolution for the design is obtained. Similarly, a design rule check process and/or a design-for-manufacturing process may be employed after an optical proximity correction process, a phase shift mask simulation analysis process, an etch simulation analysis process or a planarization simulation analysis process. Examples of electronic design tools that employ one or more of the logical analysis processes, geometry analysis processes or simulation analysis processes discussed above are described in U.S. Pat. No. 6,230,299 to McSherry et al., issued May 8, 2001, U.S. Pat. No. 6,249,903 to McSherry et al., issued Jun. 19, 2001, U.S. Pat. No. 6,339,836 to Eisenhofer et al., issued Jan. 15, 2002, U.S. Pat. No. 6,397,372 to Bozkus et al., issued May 28, 2002, U.S. Pat. No. 6,415,421 to Anderson et al., issued Jul. 2, 2002, and U.S. Pat. No. 6,425,113 to Anderson et al., issued Jul. 23, 2002, each of which are incorporated entirely herein by reference.

Software Tools for Simulation, Verification or Modification of a Circuit Layout

To facilitate an understanding of various embodiments of the invention, one such software tool for automatic design automation, directed to the analysis and modification of a design for an integrated circuit, will now be generally described. As previously noted, the terms "design" and "design data" are used herein to encompass data describing an entire microdevice, such as an integrated circuit device or micro-electromechanical system (MEMS) device. These terms also are intended, however, to encompass a smaller set of data describing one or more components of an entire microdevice, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. As also previously noted, unless otherwise specified, the term "design" as used herein is intended to encompass any type of design, including both physical layout designs and logical designs.

Figure 3:
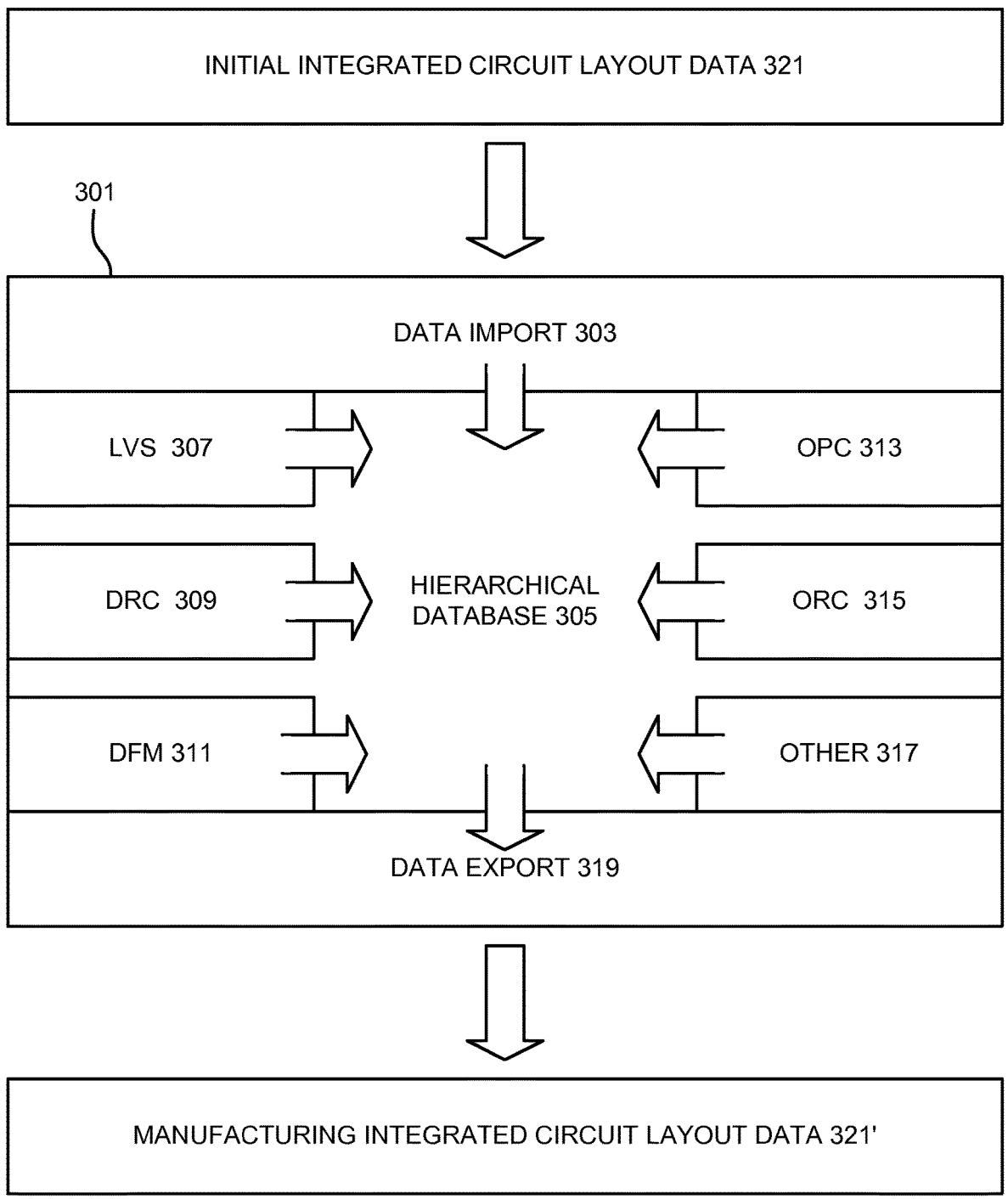
FIG. 3 schematically illustrates an example of a family of software tools for automatic design automation that may employ associative properties according to various embodiments of the invention.

As seen in FIG. 3, an analysis tool 301, which may be implemented by a variety of different software applications, includes a data import module 303 and a hierarchical database 305. The analysis tool 301 also includes a layout-versus-schematic (LVS) verification module 307, a design rule check (DRC) module 309, a design-for-manufacturing (DFM) module 311, an optical proximity correction (OPC) module 313, and an optical proximity rule check (ORC) module 315. The analysis tool 301 may further include other modules 317 for performing additional functions as desired, such as a phase shift mask (PSM) module (not shown), an etch simulation analysis module (not shown) and/or a planarization simulation analysis module (not shown). The tool 301 also has a data export module 319. One example of such an analysis tool is the Calibre family of software applications available from Mentor Graphics Corporation of Wilsonville, Oreg.

Initially, the tool 301 receives data 321 describing a physical layout design for an integrated circuit. The layout design data 321 may be in any desired format, such as, for example, the Graphic Data System II (GDSII) data format or the Open Artwork System Interchange Standard (OASIS) data format proposed by Semiconductor Equipment and Materials International (SEMI). Other formats for the data 321 may include an open source format named OpenAccess, Milkyway by Synopsys, Inc., and EDDM by Mentor Graphics, Inc. The layout data 321 includes geometric elements for manufacturing one or more portions of an integrated circuit device. For example, the initial integrated circuit layout data 321 may include a first set of polygons for creating a photolithographic mask that in turn will be used to form an isolation region of a transistor, a second set of polygons for creating a photolithographic mask that in turn will be used to form a contact electrode for the transistor, and a third set of polygons for creating a photolithographic mask that in turn will be used to form an interconnection line to the contact electrode. The initial integrated circuit layout data 321 may be converted by the data import module 303 into a format that can be more efficiently processed by the remaining components of the tool 301.

Once the data import module 303 has converted the original integrated circuit layout data 321 to the appropriate format, the layout data 321 is stored in the hierarchical database 305 for use by the various operations executed by the modules 305-317. Next, the layout-versus-schematic module 307 checks the layout design data 321 in a layout-versus-schematic process, to verify that it matches the original design specifications for the desired integrated circuit. If discrepancies between the layout design data 321 and the logical design for the integrated circuit are identified, then the layout design data 321 may be revised to address one or more of these discrepancies. Thus, the layout-versus-schematic process performed by the layout-versus-schematic module 307 may lead to a new version of the layout design data with revisions. According to various implementations of the invention tool 301, the layout data 321 may be manually revised by a user, automatically revised by the layout-versus-schematic module 307, or some combination thereof.

Next, the design rule check module 309 confirms that the verified layout data 321 complies with defined geometric design rules. If portions of the layout data 321 do not adhere to or otherwise violate the design rules, then the layout data 321 may be modified to ensure that one or more of these portions complies with the design rules. The design rule check process performed by the design rule check module 309 thus also may lead to a new version of the layout design data with various revisions. Again, with various implementations of the invention tool 301, the layout data 321 may be manually modified by a user, automatically modified by the design rule check module 309, or some combination thereof.

The modified layout data 321 is then processed by the design for manufacturing module 311. As previously noted, a "design-for-manufacture" processes attempts to identify elements in a design representing structures with a significant likelihood of being improperly formed during the manufacturing process. A "design-for-manufacture" process may additionally determine what impact the improper formation of the identified structures will have on the yield of devices manufactured from the circuit design, and/or modifications that will reduce the likelihood that the identified structures may be improperly formed during the manufacturing process. For example, a "design-for-manufacture" (DFM) software tool may identify wires that are connected by single vias, determine the yield impact based upon the probability that each individual single via will be improperly formed during the manufacturing process, and then identify areas where redundant visa can be formed to supplement the single vias.

The processed layout data 321 is then passed to the optical proximity correction module 313, which corrects the layout data 321 for manufacturing distortions that would otherwise occur during the lithographic patterning. For example, the optical proximity correction module 313 may correct for image distortions, optical proximity effects, photoresist kinetic effects, and etch loading distortions. The layout data 321 modified by the optical proximity correction module 313 then is provided to the optical process rule check module 315

The optical process rule check module 315 (more commonly called the optical rules check module or ORC module) ensures that the changes made by the optical proximity correction module 313 are actually manufacturable, a "downstream-looking" step for layout verification. This compliments the "upstream-looking" step of the LVS performed by the LVS module 307 and the self-consistency check of the DRC process performed by the DRC module 309, adding symmetry to the verification step. Thus, each of the processes performed by the design for manufacturing process 311, the optical proximity correction module 313, and the optical process rule check module 315 may lead to a new version of the layout design data with various revisions.

As previously noted, other modules 317 may be employed to perform alternate or additional manipulations of the layout data 321, as desired. For example, some implementations of the tool 301 may employ, for example, a phase shift mask module. As previously discussed, with a phase-shift mask (PSM) analysis (another approach to resolution enhancement technology (RET)), the geometric elements in a layout design are modified so that the pattern they create on the reticle will introduce contrast-enhancing interference fringes in the image. The tool 301 also may alternately or additionally employ, for example, an etch simulation analysis processes or a planarization simulation analysis processes. The process or processes performed by each of these additional modules 317 may also lead to the creation of a new version of the layout data 321 that includes revisions.

After all of the desired operations have been performed on the initial layout data 321, the data export module 319 converts the processed layout data 321 into manufacturing integrated circuit layout data 323 that can be used to form one or more masks or reticules to manufacture the integrated circuit (that is, the data export module 319 converts the processed layout data 321 into a format that can be used in a photolithographic manufacturing process). Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool.

Accordingly, the data export module 319 may "fracture" larger geometric elements in the layout design, or geometric elements that are not right triangles, rectangles or trapezoids (which typically are a majority of the geometric elements in a layout design) into the smaller, more basic polygons that can be written by the mask or reticle writing tool. Of course, the data export module 319 may alternately or additionally convert the processed layout data 321 into any desired type of data, such as data for use in a synthesis process (e.g., for creating an entry for a circuit library), data for use in a place-and-route process, data for use in calculating parasitic effects, etc. Further, the tool 301 may store one or more versions of the layout 321 containing different modifications, so that a designer can undo undesirable modifications. For example, the hierarchical database 305 may store alternate versions of the layout data 321 created during any step of the process flow between the modules 307-317.

Data Organization

The design of a new integrated circuit may include the interconnection of millions of transistors, resistors, capacitors, or other electrical structures into logic circuits, memory circuits, programmable field arrays, and other circuit devices. In order to allow a computer to more easily create and analyze these large data structures (and to allow human users to better understand these data structures), they are often hierarchically organized into smaller data structures, typically referred to as "cells." Thus, for a microprocessor or flash memory design, all of the transistors making up a memory circuit for storing a single bit may be categorized into a single "bit memory" cell. Rather than having to enumerate each transistor individually, the group of transistors making up a single-bit memory circuit can thus collectively be referred to and manipulated as a single unit. Similarly, the design data describing a larger 16-bit memory register circuit can be categorized into a single cell. This higher level "register cell" might then include sixteen bit memory cells, together with the design data describing other miscellaneous circuitry, such as an input/output circuit for transferring data into and out of each of the bit memory cells. Similarly, the design data describing a 128 kB memory array can then be concisely described as a combination of only 64,000 register cells, together with the design data describing its own miscellaneous circuitry, such as an input/output circuit for transferring data into and out of each of the register cells.

By categorizing microcircuit design data into hierarchical cells, large data structures can be processed more quickly and efficiently. For example, a circuit designer typically will analyze a design to ensure that each circuit feature described in the design complies with specified design rules. With the above example, instead of having to analyze each feature in the entire 128 kB memory array, a design rule check process can analyze the features in a single bit cell. If the cells are identical, then the results of the check will then be applicable to all of the single bit cells. Once it has confirmed that one instance of the single bit cells complies with the design rules, the design rule check process then can complete the analysis of a register cell simply by analyzing the features of its additional miscellaneous circuitry (which may itself be made of up one or more hierarchical cells). The results of this check will then be applicable to all of the register cells. Once it has confirmed that one instance of the register cells complies with the design rules, the design rule check software application can complete the analysis of the entire 128 kB memory array simply by analyzing the features of the additional miscellaneous circuitry in the memory array. Thus, the analysis of a large data structure can be compressed into the analyses of a relatively small number of cells making up the data structure.

With various examples of the invention, layout design data may include two different types of data: "drawn layer" design data and "derived layer" design data. The drawn layer data describes geometric elements that will be used to form structures in layers of material to produce the integrated circuit. The drawn layer data will usually include polygons that will be used to form structures in metal layers, diffusion layers, and polysilicon layers. The derived layers will then include features made up of combinations of drawn layer data and other derived layer data. Thus, with a transistor gate, derived layer design data describing the gate may be derived from the intersection of a polygon in the polysilicon material layer and a polygon in the diffusion material layer.

For example, a design rule check process performed by the design rule check module 309 typically will perform two types of operations: "check" operations that confirm whether design data values comply with specified parameters, and "derivation" operations that create derived layer data. A transistor gate design data thus may be created by the following derivation operation:

$$\text{gate} = \text{diff AND poly}$$

The results of this operation will be a "layer" of data identifying all intersections of diffusion layer polygons with polysilicon layer polygons. Likewise, a p-type transistor gate, formed by doping the diffusion layer with n-type material, is identified by the following derivation operation:

$$p\text{gate} = n\text{well AND gate}$$

The results of this operation then will be another "layer" of data identifying all transistor gates (i.e., intersections of diffusion layer polygons with polysilicon layer polygons) where the polygons in the diffusion layer have been doped with n-type material.

A check operation performed by the design rule check module 309 will then define a parameter or a parameter range for a data design value. For example, a user may want to ensure that no metal wiring line is within a micron of another wiring line. This type of analysis may be performed by the following check operation:

$$\text{external metal} < 1$$

The results of this operation will identify each polygon in the metal layer design data that are closer than one micron to another polygon in the metal layer design data.

Also, while the above operation employs drawn layer data, check operations may be performed on derived layer data as well. For example, if a user wanted to confirm that no transistor gate is located within one micron of another gate, the design rule check process might include the following check operation:

$$\text{external gate} < 1$$

The results of this operation will identify all gate design data representing gates that are positioned less than one micron from another gate. It should be appreciated, however, that this check operation cannot be performed until a derivation operation identifying the gates from the drawn layer design data has been performed.

Properties

Figure 4:
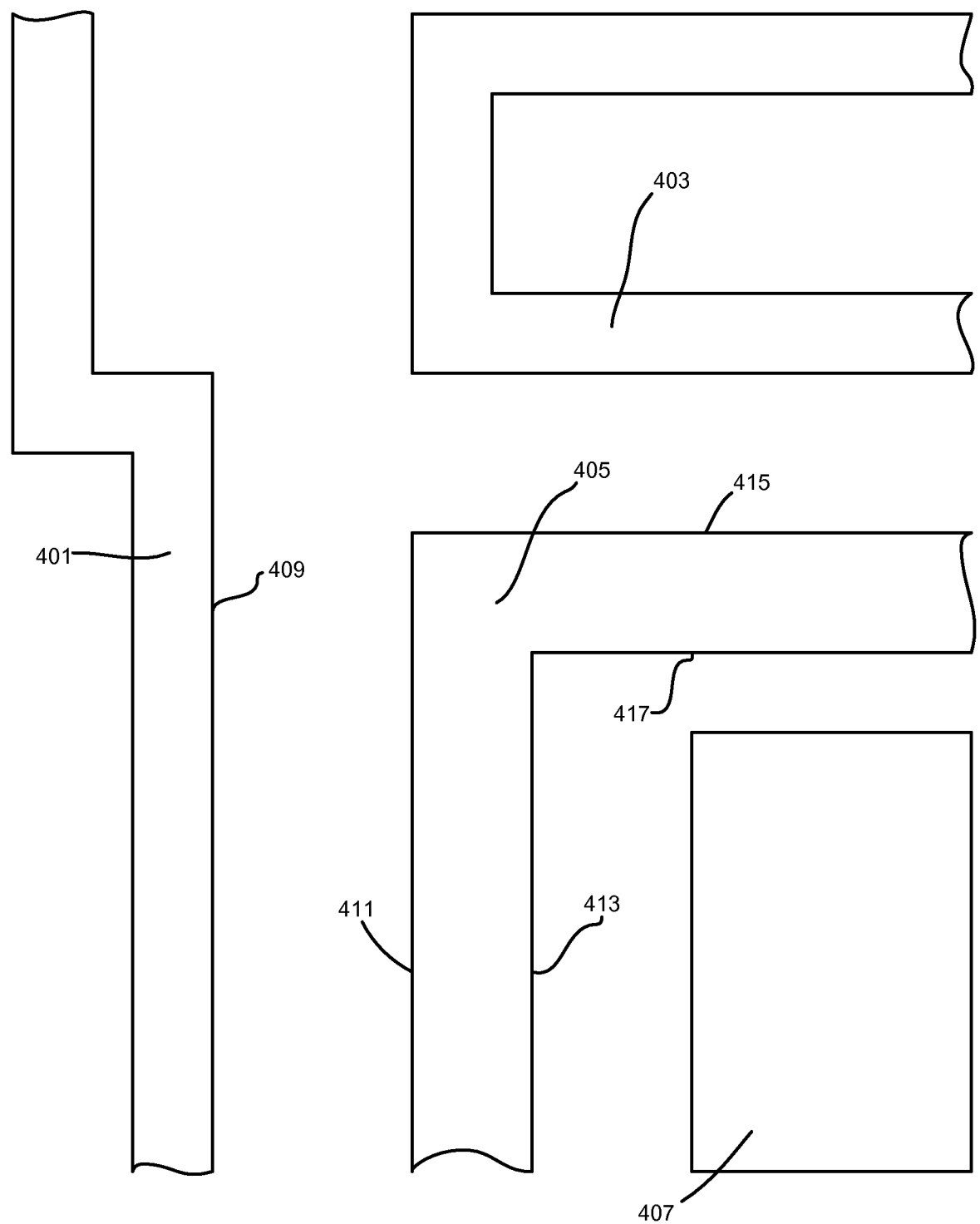
FIG. 4 illustrates geometric elements in a microcircuit layout design that may be associated with one or more properties according to various embodiments of the invention.

Various implementations of the invention relate to software tools for electronic design automation that create and/or employ associative properties. As will be discussed in more detail below, with some implementations of the invention, one or more properties can be generated and associated with any type of design object in a microdevice design. If the design is a physical layout for lithographically manufacturing an integrated circuit or other microdevice, for example, then one or more properties can be associated with any desired geometric element described in the design. Referring now to FIG. 4, this figure illustrates a portion of a layout design. The design includes a plurality of polygons 401-407 that will be used to form circuit structures in a layer of material, such as a layer of metal. Polygons 401-405, for example, may be used to form wiring lines for an integrated circuit. With various examples of the invention, one or more properties can be associated with a polygon, such as each of the polygons 401-407, or with a component of a polygon, such as the vertices of a polygon. Further, one or more properties can be associated with a polygon's edge, such as the edge 409 of the polygon 401. Still further, one or more properties can be associated with a pair of polygon edges, such as the edges 411 and 413 of the polygon 405. With various examples of the invention, each property may be represented as a new "layer" of data in the design.

When a property is associated with a design object in a layout design, its value may be derived from geometric data related to that design object. For example, if a property is associated with geometric element, such as a polygon, then it may have a value derived from the area of the polygon, the perimeter of the polygon, the number of vertices of the polygon, or the like. Similarly, if a property is associated with an edge, then the value of the property may be derived from the length or angle of the edge. Still further, if a property is associated with a pair of edges, then the value of the property may be derived from a separation distance between the edges, a total length of the edges, a difference in length between the edges, an area bounded by the edges, etc.

As will be apparent from the discussion below, however, it should be appreciated that a property value can be defined by any desired function. For example, a property may be defined as a constant value. The value of a property X thus may be defined by the function:

$$X=0.5$$

With this definition, the value of the property will always be 0.5.

A property's value also may be defined by a variable function. With a variable function, the value of a property may vary based upon, e.g., the specific data in the design. For example, a property X may be defined by the simple function:

$$X=AREA(METAL1)*0.5+(PERIMETER(METAL1))^2$$

With this function, a property value is generated for every polygon in the design layer named "metal1." (That is, the input used to generate the property X is the data layer in the design name "metal1.") For each polygon in the design layer, the area of the polygon is calculated and multiplied by 0.5. In addition, the perimeter of the polygon is determined, and then squared. The multiplicand of the polygon's area with 0.5 is then added to the square of the polygon's perimeter to generate the value of the property X for associated with that polygon.

Thus, in FIG. 4, if the perimeter of the first polygon 401 is 68, and the area of the first polygon is 64, then the value of the property $X_1$ for the first polygon is $$X_1=(64*0.5)+(68)^2=4656$$

Similarly, if the perimeter of the second polygon 403 is 60 and the area of the second polygon is 66, then the value of the property $X_2$ of the second polygon is $$X_2=(60*0.5)+(66)^2=4386.$$

Still further, if the perimeter of the third polygon 405 is 60 and the area of the second polygon is 84, then the value of the property $X_3$ of the third polygon is $$X_1=(60*0.5)+(84)^2=7086,$$

and if the perimeter of the fourth polygon 407 is 34 and the area of the second polygon is 70, then the value of the property $X_4$ of the fourth polygon is $$X_4=(34*0.5)+(70)^2=4917$$

In addition to a "simple" function like that described above, a property also may be defined by a compound function that incorporates a previously-generated property value. For example, a first property X may be defined by the simple function described above:

$$X=AREA(METAL1)*5+(PERIMETER(METAL1))^2$$

A second property, Y, can then be defined by a function that incorporates the value of the first property X, as follows:

$$Y=PROP(METAL1,X)+1$$

Thus, the value of the property Y for a polygon is the value of the property X calculated for that polygon, plus one.

In addition to being defined by simple and compound functions, a property may be defined so that no property value is generated under some conditions. For example, a property associated with a polygon may be defined so that, if the area of the polygon is smaller than a threshold value, then no value is generated for the property. This feature may be useful where, for example, property values need only be generated for design objects having desired characteristics. If a design object does not have the required characteristics, then no property will be generated for the design object and it can be ignored in subsequent calculations using the generated property values.

More generally, a property's value may be defined by alternative functions, such as the functions below:

$$\text{IF AREA(METAL1)}<0.5, \text{ THEN } X=1$$

$$\text{IF AREA(METAL1)}\geq 1, \text{ THEN } X=AREA(METAL1)\\*0.5+(PERIMETER(METAL1))^2$$

With these alternative functions, each polygon in the data layer "metal1" is analyzed. If the area of the polygon is below 0.5, then the value of the property X for the polygon is 1. Otherwise, the value of the property X for the polygon is the area of the polygon multiplied by 0.5, added to the square of the perimeter of the polygon.

A property may have multiple values. For example, a property may have an x-coordinate value, a y-coordinate value, and a Z-coordinate value. Moreover, a property may have multiple, heterogeneous values. For example, a property may have a numerical value and a string value. Thus, a property associated with a cell can have a numerical value that may be, e.g., a device count of devices in the cell, while the string value may be, e.g., a model name identifying the library source for the cell. Of course, a property with multiple heterogeneous values can include any combination of value types, including any combination of the value types described above (e.g., one or more constant values, one or more vector values, one or more dynamic values, one or more alternate values, one or more simple values, one or more compound values, one or more alternate values, one or more string values, etc.).

Still further, the number of values of a property may change dynamically change. For example, a property K may have the values "a" and "b" (i.e., value of property K=a, b) before an electronic design automation process is executed. The electronic design automation process may then change the property to include a third value "c" (i.e., value of property K=a, b, c). Of course, the electronic design automation process also may alternately or additionally change the values of property K to one or more completely different values (e.g., value of property K=d, e, f). Moreover, with some implementations of the invention, the value of a property at one time may depend upon the value of the property at a previous time. For example, the value of a property Q at time $t_2$ may be derived from the value of the property Q at time $t_1$. Of course, in addition to constant values, and values generated based upon simple, compound, or alternative variable functions, a property's value can be specified according to any desired definition. For example, in addition to single or alternate mathematical functions, the value of a property may even be an array of constant values, variable functions, or some combination thereof. It should be appreciated, however, that, by using a scripting language as described above, property values can be dynamically generated during an electronic design automation process.

That is, by specifying property value definitions using a scripting language, the actual property values can be generated based upon the definitions when the design is analyzed during an electronic design automation process. If the data in the design is changed, then the property values will automatically be recalculated without requiring further input from the designer. Thus, employing a scripting language allows a designer or other user to develop properties and determine their values as needed. It also may provide the flexibility to allow third parties to develop new analysis techniques and methods, and then specify scripts that allow the user of an electronic design automation tool to use the scripts developed by a third party to generate property values for use with those new techniques and methods.

As previously noted, a property may be associated with any desired type of design object in a design. Thus, in addition to a single geometric element in a layout design, such as a polygon, edge, or edge pair, a property also can be associated with a group of one or more design objects in a layout design. For example, a property may be associated with a group of polygons or a hierarchical cell in a layout design (which themselves may be considered together as a single design object). A property also may be associated with an entire category of one or more design objects. For example, a property may be associated with every occurrence of a type of design object in a design layer, such as with every cell in a design, or every instance of a type of geometric element occurring in a design. A property also may be specifically associated with a particular placement of a cell in a design. In addition to design objects in a layout design, properties also may be associated with design objects in other types of designs, such as logical designs. A property thus may be associated with any desired object in a logical design, such as a net, a device, an instance of a connection pin, or even a placement of a cell in the design.

It also should be appreciated that, with various embodiments of the invention, a property associated with one design object also can be associated with another design object. Further, a property's value may be calculated using geometric or logical data for any desired design object, including design objects different from the design object with which the property is associated. With some implementations of the invention, a property's value may even be calculated using geometric or logical data for one or more design objects from multiple design data layers. For example, a designer may specify a design layer entitled "pair" that includes any specified edge pairs in a layout design, and another design layer entitled "edge" that includes specified edges in a layout design. A designer can then define a property Z for each edge in the edge layer as:

$$Z=AREA(METAL1)/LENGTH(EDGE)+EW(PAIR)$$

where AREA is the area of one or more polygons related to the edge, LENGTH is the length of the edge, and EW is the width between the edges of an edge pair related to the edge. Thus, the value of the property Z for an edge is dependent upon the area of some other polygon related to the edge.

With some implementations of the invention, various algorithms can be used to define which design objects, such as geometric elements, will be related to each other for use in a property definition. For example, the definition for property Z above may employ a relationship algorithm that includes a polygon in the property value determination if the polygon touches the edge associated with the property, and includes an edge pair in the property value determination if one edge is the edge associated with the property and the second edge is connected to the first edge through a polygon (i.e., both edges are part of the same polygon, as opposed to being separated by an empty space).

Of course, any desired algorithms can be used to determine which design objects will be related to each other for determining the value of a property. Other possible relationship algorithms for physical layout designs, for example, may relate all geometric elements that overlap, all geometric elements that intersect, all geometric elements that touch or otherwise contact each other, or all geometric elements that are within a defined proximity of another geometric element. With still other relationship algorithms, if one geometric element touches multiple geometric elements, the algorithms can decide to treat the touching geometric elements as errors, or to relate all touched shapes. Still other relationship algorithms can employ clipping, where, e.g., if a first geometric element intersects a second geometric element, only the part of the second geometric element inside the first geometric element is employed when determining a property value, etc.

Similarly, a variety of relationship algorithms can be used to relate design objects in a logical design to each other for use in a property definition. For example, a property definition may relate all design objects that belong to the same logical device, all design objects that share a common net, or all design objects that share a reference identifier with, e.g., the design object with which the property is associated. Of course, still other relationship criteria can be employed to relate design objects in designs to each other for use in a property definition.

Further, by defining a second property value so that it incorporates a first property value, a property value associated with any design object or group of design objects can be associated with any other design object or group of design objects. For example, a property for a first polygon may be the area of that polygon. A property for a second polygon touching or contacting that first polygon can then be defined as the area of the first polygon. In this manner, a property value associated with the first polygon can be associated with the second polygon. Thus, a property associated with a geometric element also can be associated with a cell incorporating that geometric element. Similarly, a property associated with a geometric element can be associated with an adjacent geometric element. Still further, a property of a geometric element can be associated with the entire data layer in a design.

With various implementations of the invention, the value of a property associated with a design object property value is separate from a description of the design object with which the property is associated. That is, with various implementations of the invention the value of a property is not simply a characteristic of the design object with which the property is associated, but instead may be considered a distinct design object itself. According to some implementations of the invention, for example, the property values for various design objects may be stored in an array. FIG. 5 illustrates one example of a type of array that may be employed by various implementations of the invention. As seen in this figure, the array 501 includes a column listing identifiers 503. It also includes a column with property values 505 for a property G, a column with property values 505 for a property H, and a column with property values 505 for a property I.

Each identifier 503 identifies an occurrence of a design object associated with each of the properties G, H, and I. With the illustrated example, the design object may be, e.g., a type of cell in a hierarchical physical layout design. The definition for the property G then may be the coordinate value for the placement of the cell, while the definition of the property H may be both the library from which the cell was obtained and the count of the cell in the design. The definition of the property I then may be the percentage at which the structure described in the cell will be improperly formed during a manufacturing process. From the array 501, it can thus be determined that, e.g., the cell "design object 8" is located at the x, y coordinate values 40, 8 in the design, was originally obtained from library 8, and is the ninth occurrence of that cell in the design. Also, the value of property I for this cell indicates that it has a 0.000009% failure rate when manufactured.

While a table-type array is illustrated in FIG. 5 for each of understanding, it should be appreciated that, as used herein, the term "array" is intended to encompass any type of data structure that behaves like a logical array. Thus, various implementations of the invention may alternately or additionally employ, for example, such structures as a Calibre number table (used with the Calibre family of software tools available from Mentor Graphics Corporation of Wilsonville, Oreg.) or a Standard Template Library (STL) deque. It also should be appreciated that, while FIG. 5 illustrates a single set of property values for each design object, various implementations of the invention may allow multiple identifies to be associated with a single set of property values. This arrangement may be beneficial, e.g., for reducing memory usage where one or more design objects will have the same value for an associated property. Also, it should be noted that various implementations of the invention may update a property value by overwriting or otherwise replacing the previous property value in memory with the updated property value, to conserve memory usage.

Transfer of Property Values from One EDA Process to Another EDA Process

One use of properties according to various implementations of the invention is to transfer information determined in one electronic design automation process to another electronic design automation process in a format that can readily be used by the second electronic design automation process. For example, properties can be defined and used to transfer information from a simulation analysis process (such as an optical proximity correction process, an etch simulation analysis process, or a planarization simulation analysis process) to a geometry analysis process (such as a design rule check process, a design for manufacturing process, or an optical rules check process) or a logic analysis process (such as a layout-versus-schematic process, an electrical rule checking process, or a design logic verification process). Similarly, properties can be used to transfer information from a geometry analysis process to a simulation analysis process or a logic analysis process, or to transfer information from a logic analysis process to a simulation analysis process or a geometry analysis process.

A variety of information can be transferred from one EDA process to another EDA process. For example, one EDA process could, in the course of operation, determine information relating to the yield of design objects in a layout design, and provide that information as property values associated with the design objects. Yield information may include, for example, the likelihood that a design design object will not be manufactured correctly and thus will not perform according to specification.

For example, referring back to FIG. 4, the likelihood that two adjacent parallel wiring lines will be improperly manufactured and "bridge" together may be dependent upon the width of the lines, the distance between the lines, and the length for which the lines are adjacent. As discussed in detail above, the value of a property Z can take into account the area of one or more polygons related to the edge 411, the length of the edge 411, and the width between the edges 409 and 411. Accordingly, the value of this property (or a property with a similar definition that relates these features) can be used to determine the likelihood that the wires 409 and 411 will bridge together during a manufacturing process. Thus, an EDA process that can easily calculate the value of property Z, such as a design-rule-check process, can determine a value for the property Z with respect to the line 409 or the line 411. Anther EDA process, such as a DFM process, can then employ that property value to, e.g., determine the likelihood that the wires 409 and 411 will bridge together during a manufacturing process Still other information that may be generated during one EDA process and then provided to another EDA process is failure prediction. Failure prediction may, e.g., map yield information to particular design features. For example, if a via has a low yield, and if its failure will cause a device in the manufactured circuit to be "stuck open," the failure prediction information may correlate the low yield of the via to the likelihood that a net connected to the device will be stuck open. Still other information that may be generated during one EDA process and then provided to another EDA process as property information includes test hints, which suggest test patterns to stress potential failure in a manufactured circuit. For example, the test hint may suggest test patterns that will test potential failures identified by failure prediction information. It also may include reliability information, corresponding to delayed failures that may occur during the use of the manufactured device, such as the failure of a contact from thermal stress. Yet other information that can be conveyed from one EDA process to another EDA process as property information includes reliability and manufacturability metrics. These metrics may be, e.g., specific qualitative characteristics for certain failure mechanisms such as, for example, variation across process window or probability of photoresist collapse.

Additionally, planarity information can be conveyed from one EDA process (such as a planarization simulation analysis process) to another EDA process. This type of information may include, e.g., information generated using planarity models that simulate the process of chemical-mechanical polishing to predicted thickness after polishing based on distribution of hardness of the materials across the chip (oxide is harder than everything else, copper is softer, polysilicon is in between). Still further, heat dissipation information may be determined by one EDA process, and then provided to anther EDA process in the form of property values.

Figure 6:
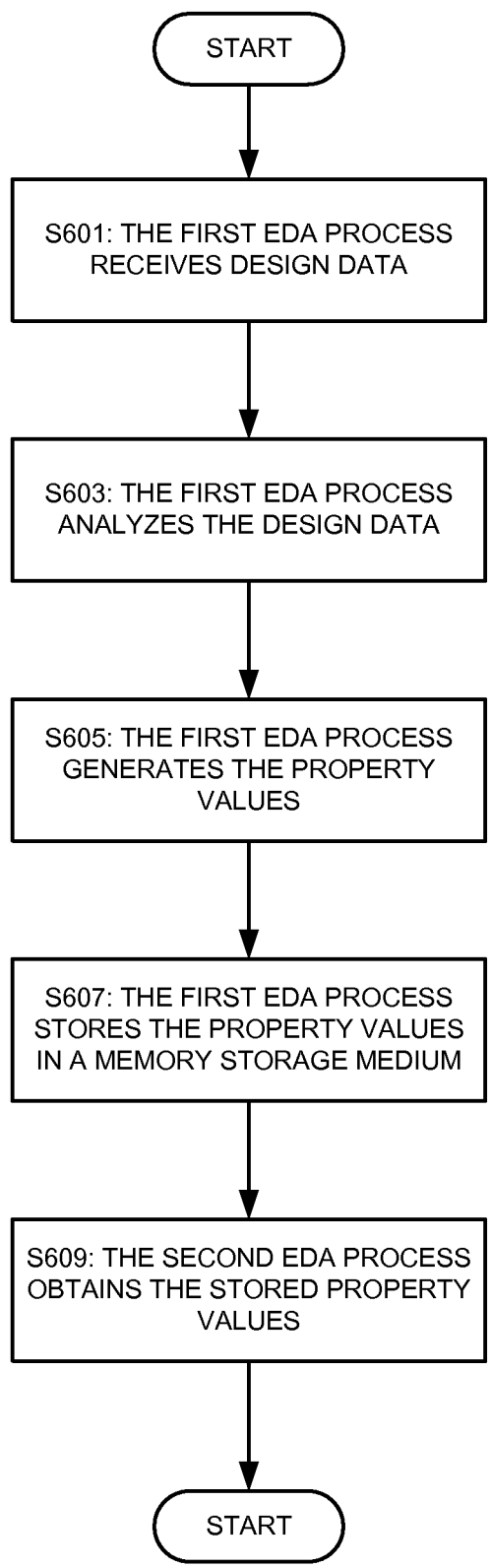
FIG. 6 illustrates a flowchart showing a method that an EDA process may use to generate and provide a property value to another EDA process.

FIG. 6 illustrates a flowchart showing a method that an EDA process may use to generate and provide a property value to another EDA process. In step 601, the first EDA process receives design data. Next, in step 603, the first EDA process analyzes the design data, and in step 605 generates one or more property values from the design data based upon the definition of the property. The, in step 607, the first EDA process stores the property values in a memory storage medium for use by the second EDA process. With various implementations of the invention, the memory storage medium may be any type of storage medium, such as a processor register, RAM, a magnetic memory storage disc, an optical storage disc or other format, etc. In step 609, the second EDA process obtains the stored property values for use in its own execution. With some implementations of the invention, the generated property values may be provided immediately to the second EDA process. With this arrangement, the property values may only be briefly stored in memory, such as in a process register. For still other implementations, however, the property values may be stored in a more long-term storage medium, and the second EDA process initiated some time after the property values have been generated.

Transfer of Property Values from an OPC Process to a DFM or LVS Process

To illustrate one example of the exchange of properties between EDA process in more detail, the use of properties to transfer information from an OPC process to a DFM process or to an LVS process will be discussed. Optical proximity correction (OPC) is one type of process frequently provided by electronic design automation tools. As microcircuits have evolved to include smaller and smaller features, many circuit designs now include features that are smaller than the light wavelength that will be used to create those features during a lithographic process. This type of subwavelength imaging often creates distortions during the lithographic process, however. To address these distortions, correction algorithms are employed to modify the physical layout of the circuit design, as noted above. This process is generally called optical proximity correction (OPC). Thus, as used herein, the term optical proximity correction includes the modification of a physical layout of a circuit design to improve the reproduction accuracy of the layout during a lithographic process. In addition, however, the term optical proximity correction as used herein will also include the modification of the physical layout design to improve the robustness of the lithographic process for, e.g., printing isolated features and/or features at abrupt proximity transitions.

During optical proximity correction, the polygon edges of the physical layout are divided into small fragments. These fragments are then moved, and additional small polygons may be added to the physical layout at strategic locations. The lithographic process is then simulated to determine whether the image that would be created by the modified or "corrected" layout would be better than the image created that would be created by previous modifications to the layout image. This process is then iteratively repeated until a modified layout the simulation and verification tool generates a modified layout that will produce a satisfactory image resolution during an actual lithographic process.

Typically, optical proximity correction techniques are classified as either rule-based or model-based. With rule-based optical proximity correction, the layout modifications are generated based upon specific rules. For example, small serifs may be automatically added to each convex (i.e., outwardly-pointing) 90° corner in the layout. Model-based optical proximity correction generally will be significantly more complex than rule-based optical proximity correction. With model-based optical proximity correction, lithographic process data obtained from test layouts are used to create mathematical models of the lithographic patterning behavior. Using an appropriate model, the simulation and verification tool will then calculate the image that will be created by a corrected layout during the lithographic process. The layout features undergoing correction then are iteratively manipulated until the image for the layout (calculated using the model) is sufficiently close to the desired layout image. Thus, some model-based optical proximity correction algorithms may require the simulation of multiple lithographic process effects by a calculating a weighted sum of pre-simulated results for edges and corners. An example of an optical proximity correction algorithm is described in "Fast Optical Process And Proximity Correction Algorithms for Integrated Circuit Manufacturing," by Nick Cobb (Ph.D. Thesis), University of California, Berkeley, 1998.

As will be appreciated by those of ordinary skill in the art, performing a rule-based optical proximity correction process is computationally more intensive than performing a design rule check, and performing a model-based optical proximity correction is even more so. Further, the computations required for the optical proximity correction process are more sophisticated than the computations that usually would be employed in a design rule check process. Obtaining a simulated lithographic image, for example, may involve modeling the lithographic light source as a plurality of separate coherent light sources arranged at different angles. For each such coherent light source, a simulated image is obtained by calculating a fast Fourier transform (FFT) to model the operation of the lens used in the lithographic process. These simulated images are then summed to obtain the image that would be produced by the lithographic process.

Accordingly, an OPC process will employ a different data "resolution" than a DFM or LVS process. For example, in analyzing a simple rectangular polygon that represents a transistor gate, the OPC process may transform the rectangular polygon into a contoured polygon with perhaps millions of edges. Thus, an OPC process will typically execute massively parallel operations that (1) divide relatively large polygons in a design into a much larger number (e.g., a million) of relatively small polygons, and (2) may require ignoring a hierarchical structure of the data being analyzed.

As a result, information generated by an OPC process typically is incompatible with a DFM or LVS process, each of which usually executes calculations on the relatively large polygons in the original design, and significantly benefits from performing those calculations using a hierarchical arrangement in the design.

For example, with a rectangular polygon representing a transistor gate, an OPC process will generate a very contoured polygon that represents the actual details of the gate's shape after diffraction has occurred in a lithographic manufacturing process. An LVS process, on the other hand, only requires an overall width and length of the gate to characterize the device. Accordingly, an LVS process may use a formula that averages the widths of the contoured gate shape calculated by the OPC process, and this average value is then used by the LVS to characterize the device. In order to calculate this average width value, however, the LVS process typically must obtain the detailed contour information from the OPC process, which is undesirable. With various examples of the invention, these average width values can easily be calculated by the OPC, and the results attached as property values to the original gate polygon. These property values describing contour information, which were efficiently calculated by the OPC process, then can be passed onto the LVS process. In turn, the LVS process can then be configured to use the received property values to identify the device. In this manner, each process can operate in its optimum mode for processing design data.

As will be appreciated by those of ordinary skill in the art, the transfer of information from an OPC process to a DFM process via properties is similar, but can more generic, in that a broad range of information may be analyzed in a DFM process. For example, a DFM process may wish to perform a fault probability calculation for a wire based upon a "pullback" value for a wire (an amount that the wire will retract or extend due to diffraction in a manufacturing process). Typically, a DFM process cannot easily calculate this type of value. With various examples of the invention, however, an OPC process can calculate a pullback value for a wire, and then attach this value as a property value to the simple layout polygon on which the OPC analysis was performed. A DFM process can then subsequently use this pullback value to improve the accuracy of the DFM process results without requiring a corresponding increase in calculations.

In addition to pullback information, an OPC process may determine still other types of contour information as one or more property values, and pass those property values onto an LVS or DFM process. For example, the OPC process may generate property values describing gate variation, contact stability, interconnection variation, bridging, etc. By then providing these property values to an LVS or DFM process, the LVS or DFM process can then use these values during its own operation, without having to recalculate the information.

Yet another example of the use of properties to transfer information from one electronic design automation process to another electronic design automation process relates to the determination of a variation band. Process variation bands are discussed in detail in U.S. Patent Publication No. 20050251771, published on Nov. 10, 2005, entitled "Integrated Circuit Layout Design Methodology With Process Variation Bands," naming Juan Andres Torres Robles as inventor, which publication is incorporated entirely herein by reference. A process variation band can be calculated by an OPC process. The process variation band represents a range of possible shape variations produced by a polygon in a layout design that may result from diffraction created by different process conditions during a manufacturing process. The results of the process variation band can then be attached to the corresponding polygon for subsequent use in a DFM process. For example, a polygon may have associated property values that can include both calculated geometric values (e.g., a band deviation of 0.1) and parameters at which those geometric values were calculated (e.g., the band deviation of 0.1 was calculated for a defocusing of 1%).

This property information provided by the OPC process then can be used by a DFM process in any desired manner. For example, a DFM can do an initial check for bridging faults using the simple polygons in the original layout design. Where the DFM process determines that there is a likelihood of a fault, the DFM process can check the process variation band values provided as associated property values to calculate if a fault will occur (or the likelihood that a fault may occur) with greater accuracy. Still further, the DFM process can alternately or additionally determine a failure area falling between two adjacent "marker" areas on adjacent lines. Using the process variation information passed as property values from the OPC process, the DFM process then can determine a process variation index that represents the overlap of the process variation band area with the fault area (as, e.g., a simple ratio). Based upon this process variation index, the DFM process can determine the likelihood of a fault occurring at the associated bridge area. By adding up the process variation index values (which themselves can be recorded as property values) for each marker in a wire, the DFM value can, e.g., identify the wire in a design that is most likely to cause a fault, or identify a marker area that is most likely to cause wire to fail, etc.

As discussed above, various examples of the invention have been described with regard to the use of property values generated during an OPC process in subsequent electronic design automation processes. It should be appreciated, however, that the use of property values are not limited to those generated during an OPC process. Other implementations of the invention may, for example, use property values generated by any optical-related electronic design automation process in other, subsequent electronic design automation processes. For example, some implementations of the invention may similarly use property values generated during an optical proximity rule check (ORC) process or a phase shift mask (PSM) process in subsequent electronic design automation processes.

Transfer of Property Values Between a DFM Process and an LVS Process

Still further, properties may be employed according to various examples of the invention to transfer information from a DFM process to a LVS process. An LVS process typically identifies or characterizes a device by starting with a basic polygon in the device as the source of a device identification, and then analyzing each touching or overlapping polygon in the design to determine the extent of the device. As a result, a LVS process typically cannot consider polygons that are separate from a device as part of the device's identification analysis. In order to accurately characterize a device in a design, however, an LVS process may need to use of measurements of geometric features that are outside of what the LVS process would normally recognize as being related to the device.

For example, in order to characterize the operation of a device using strained silicon, such as a transistor, the LVS process may the amount of stress applied to the transistor gate by the strained silicon. In order to make this determination, the LVS process should know a distance between the strained silicon material and any holes formed in an adjacent but separate device (e.g., a wire). Because the LVS process cannot measure features relating to the adjacent device, however, it may not be able to accurately characterize the strained silicon device. With various examples of the invention, however, a DFM process can measure distances between the strained silicon device and holes in an adjacent wire. The DFM process then can record these measurements as property values associated with polygon representing the gate of the strained silicon device. The LVS process can then subsequently employ these properties to characterize the operation of the strained silicon device without having to perform any analysis of adjacent devices. Accordingly, it may be useful for an LVS process to have some information outside of a device's boundaries, and this external information can be provided to the LVS process by another process using property values in accordance with various implementations of the invention.

Still further, property values can be passed from an LVS process to a DFM process. For example, an LVS process can identify polygons in a design that represent gates for a high-current MOS transistor, and then record property values for these polygons identifying them as gates for a high current MOS transistor (e.g., as a property with a numerical value of a current load for the gate identifying it as a high current MOS, or as a property with a string value of "high current MOS," etc.). These property values then can be passed back to the DFM process. The DFM process could then use a filter to identify the high-current MOS structures, and perform whatever operation is desired on those structures identified through the filter.

Still further, properties can be used to transfer information from a design object in one type of design to another design object in another type of design. For example, an LVS process can determine operational characteristics for a design object in a design, such as the capacitance of a transistor. The LVS process can then store these operation characteristics as property values associated with the data structure, and provide these property values to a corresponding data structure in, e.g., a logical design. Similarly, a DFM process may use a PEX (parasitic extraction) process to calculate, e.g., capacitance, which can then be employed as a property in a layout design or a schematic design.

Transfer of Properties Within an EDA Process

Another use of properties that may be employed according to various implementations of the invention is to transfer information from one portion of an electronic design automation process to another portion of that electronic design automation process in a format that can readily be used by the second portion of the electronic design automation process. Again, a variety of information can be transferred within a single EDA process using property values, such as yield information, failure prediction information, and test hints. It also may include reliability information, reliability and manufacturability metrics, planarity information, and heat dissipation information.

Figure 7:
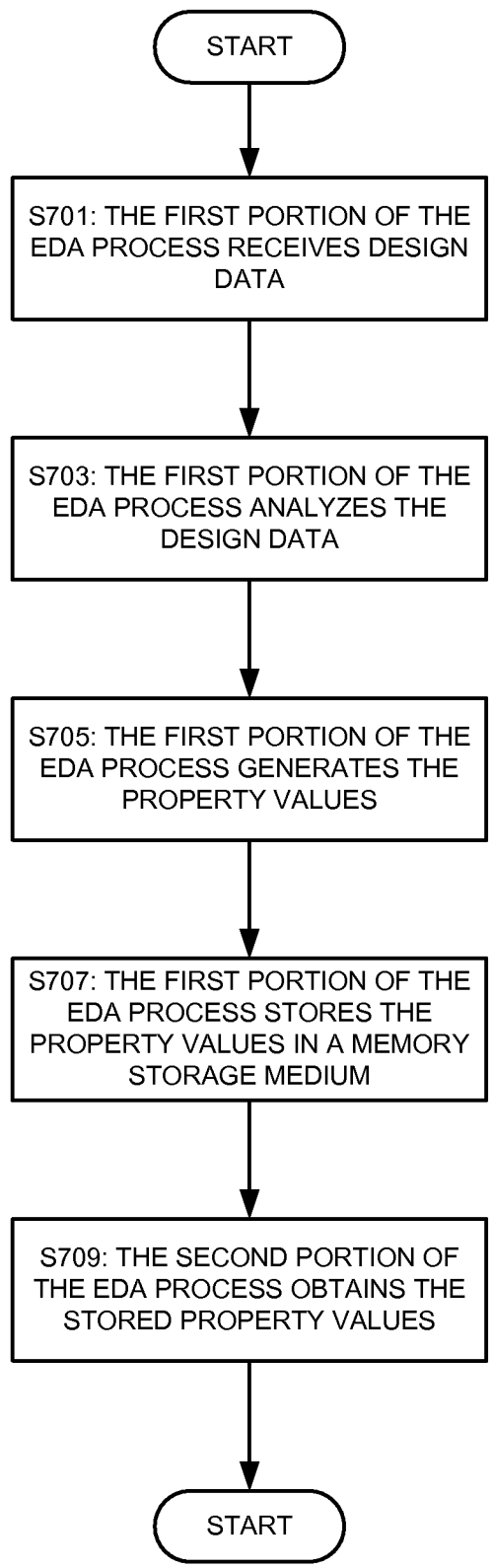
FIG. 7 illustrates a flowchart showing a method that a first portion of an EDA process may use to generate and provide a property value to a second portion of an EDA process.

FIG. 7 illustrates a flowchart showing a method that a first portion of an EDA process may use to generate and provide a property value to a second portion of the EDA process. In step 701, the first portion of the EDA process receives design data. Next, in step 703, the first portion of the EDA process analyzes the design data, and in step 705 generates one or more property values from the design data based upon the definition of the property. The, in step 707, the first portion of the EDA process stores the property values in a memory storage medium for use by the second portion of the EDA process. With various implementations of the invention, the memory storage medium may be any type of storage medium, such as a processor register, RAM, a magnetic memory storage disc, an optical storage disc or other format, etc. In step 709, the second portion of the EDA process obtains the stored property values for use in its own execution. With some implementations of the invention, the generated property values may be provided immediately to the second portion of the EDA process. With this arrangement, the property values may only be briefly stored in memory, such as in a process register. For still other implementations, however, the property values may be stored in a more long-term storage medium, and the second portion of the EDA process initiated some time after the property values have been generated.

Transfer of Properties Within a DFM Process

Again, to illustrate one example of the exchange of properties within a single EDA process in more detail, the use of properties to transfer information within a DFM process will be discussed. Different functions of a DFM process can use different levels of data "resolution." A DFM process may provide a high level manufacturing yield calculation for an entire circuit, which will have a different data resolution than a fault probability using detailed information for a specific combination of geometric elements. Accordingly, a DFM process will calculate fault information for individual geometric elements, and attach this fault information as property values to a higher level design object (e.g., a net or a cell) for use when a designer wishes to perform a broader analysis of yield probabilities.

Moreover, a DFM process can calculate enhancements, such as doubled vias to avoid via formation failures. With via doubling, for example, a second via can be placed at one of four possible locations relative to the original via (i.e., above, below, to the left, or to the right). A DFM process could calculate all possible options, determine characteristics for each option (e.g., capacitance change) for each option, and save the determined characteristics as property values. Various option combinations could then be generated using the properties to determine an optimum option selection that would comply with desired specifications. The property values also could be used to determine a potential loss with each element based upon process parameters, and to determine how much a process improvement would result in a yield improvement.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

Thus, in addition to use with "design-for-manufacture" processes, various examples of the invention can be employed with "design-for-yield" (DFY) electronic design automation processes, "yield assistance" electronic design automation processes, "lithographic-friendly-design" (LFD) electronic design automation processes, including "chip cleaning" and "design cleaning" electronic design automation processes, etc. Likewise, in addition to use with "design-rule-check" electronic design automation processes, various implementations of the invention may be employed with "physical verification" electronic design automation processes. Also, in addition to being used with OPC and ORC electronic design automation processes, various implementations of the invention may be used with any type of resolution enhancement electronic design automation processes.

What is claimed is:

1. A method comprising:
by a computing system:
accessing a circuit design that includes a design object;
executing a first electronic design automation (EDA) process to analyze the circuit design, including by computing a property value for a property associated with the design object, the property value defined by a variable function such that the property value changes based on specific data in the circuit design;
storing the property value computed for the design object by the first EDA process in a storage medium; and
executing a second EDA process to analyze the circuit design, including by the second EDA process obtaining the property value computed by the first EDA process such that the second EDA process does not need to recompute the property value for analysis of the circuit design by the second EDA process with the property value, wherein the first EDA process comprises a geometry analysis process and the second EDA process comprises a simulation analysis process or a logic analysis process.

2. The method of claim 1, wherein the variable function incorporates geometric data in the circuit design.

3. The method of claim 1, wherein the variable function is described in a program script.

4. The method of claim 1, wherein the property value comprises a compound value that incorporates a second property different from the property.

5. The method of claim 1, wherein the property value comprises an array of values.

6. The method of claim 1, wherein the property value comprises two or more concurrent values.

7. The method of claim 6, wherein the two or more concurrent values of the property value are coordinate values.

8. The method of claim 1, wherein the property value is defined by the variable function that incorporates data from another design object different from the design object.

9. The method of claim 1, wherein the first EDA process comprises a design for manufacture (DFM) process, the property comprises a hole distance of a strained silicon object of the circuit design, and the second EDA process comprises a layout versus schematic (LVS) process;
wherein executing the DFM process comprises:
determining, as the property value for the hole distance of the strained silicon object, a distance between the strained silicon object and a hole formed by a different device adjacent to the strained silicon object in the circuit design; and
wherein executing the LVS process comprises:
obtaining the property value for the hole distance of the strained silicon object computed through execution of the OPC process; and
using the obtained property value for the hole distance to perform a stress determination on the strained silicon device.

10. A non-transitory machine-readable medium storing instructions that, when executed by a processor, cause a system to:
access a circuit design that includes a design object;
execute a first electronic design automation (EDA) process to analyze the circuit design, including by computing a property value for a property associated with the design object, the property value defined by a variable function such that the property value changes based on specific data in the circuit design;
store the property value computed for the design object by the first EDA process in a storage medium; and
execute a second EDA process to analyze the circuit design, including by the second EDA process obtaining the property value computed by the first EDA process such that the second EDA process does not need to recompute the property value for analysis of the circuit design by the second EDA process with the property value, wherein the first EDA process comprises a geometry analysis process and the second EDA process comprises a simulation analysis process or a logic analysis process.

11. The non-transitory machine-readable medium of claim 10, wherein the variable function incorporates geometric data in the circuit design.

12. The non-transitory machine-readable medium of claim 10, wherein the variable function is described in a program script.

13. The non-transitory machine-readable medium of claim 10, wherein the property value comprises a compound value that incorporates a second property different from the property.

14. The non-transitory machine-readable medium of claim 10, wherein the property value comprises an array of values.

15. The non-transitory machine-readable medium of claim 10, wherein the property value comprises two or more concurrent values.

16. The non-transitory machine-readable medium of claim 10, wherein the two or more concurrent values of the property value are coordinate values.

17. The non-transitory machine-readable medium of claim 10, wherein the property value is defined by the variable function that incorporates data from another design object different from the design object.

18. The non-transitory machine-readable medium of claim 10, wherein the first EDA process comprises a design for manufacture (DFM) process, the property comprises a hole distance of a strained silicon object of the circuit design, and the second EDA process comprises a layout versus schematic (LVS) process;
wherein the instructions to execute the DFM process comprise instructions to:
determine, as the property value for the hole distance of the strained silicon object, a distance between the strained silicon object and a hole formed by a different device adjacent to the strained silicon object in the circuit design; and
wherein the instructions to execute the LVS process comprise instructions to:
obtain the property value for the hole distance of the strained silicon object computed through execution of the OPC process; and
use the obtained property value for the hole distance to perform a stress determination on the strained silicon device.

19. A non-transitory machine-readable medium storing instructions that, when executed by a processor, cause a system to:
- access a circuit design that includes a design object;
- execute an optical proximity correction (OPC) process to analyze the circuit design, including through computing a property value for a gate width associated with a transistor gate object of the circuit design by:
  - transforming the transistor gate object into a contoured gate polygon with an increased number of edges and that represents a simulated shape of the transistor gate after diffraction through a lithographic manufacturing process; and
  - determining, as the property value for the gate width of the transistor gate, an average width value for the contoured gate polygon; and
- store the property value of the gate width for the transistor gate object computed by the first EDA process in a storage medium; and
- execute a layout versus schematic (LVS) process to analyze the circuit design, including through the LVS process:
  - obtaining the property value for the gate width of the transistor gate computed by the OPC process; and
  - characterizing the transistor gate through the LVS process without re-transforming the transistor gate into the contoured gate polygon, by using the obtained property value for the gate width of the transistor gate.

\* \* \* \* \*